United States Patent
Custance et al.

(10) Patent No.: US 11,414,180 B2
(45) Date of Patent: Aug. 16, 2022

(54) AIRCRAFT ASSEMBLY WITH A HOT-AIR EXHAUST OUTLET AND COOPERATING VORTEX GENERATOR, AND METHOD CONTROLLING SAME

(71) Applicant: AIRBUS OPERATIONS LIMITED, Bristol (GB)

(72) Inventors: Denys Custance, Bristol (GB); Daren Healy, Bristol (GB)

(73) Assignee: Airbus Operations Limited, Bristol (GB)

( * ) Notice: Subject to any disclaimer, the term of this patent is extended or adjusted under 35 U.S.C. 154(b) by 235 days.

(21) Appl. No.: 16/662,520

(22) Filed: Oct. 24, 2019

(65) Prior Publication Data

US 2020/0130815 A1    Apr. 30, 2020

(30) Foreign Application Priority Data

Oct. 26, 2018   (GB) ...................................... 1817479

(51) Int. Cl.
*B64C 23/06* (2006.01)
*B64D 33/04* (2006.01)

(52) U.S. Cl.
CPC .............. *B64C 23/06* (2013.01); *B64D 33/04* (2013.01)

(58) Field of Classification Search
CPC ........... B64C 7/02; B64C 21/02; B64C 23/06; B64D 33/04
USPC ...................................................... 244/199.1
See application file for complete search history.

(56) References Cited

U.S. PATENT DOCUMENTS

| | | | | |
|---|---|---|---|---|
| 3,841,587 | A * | 10/1974 | Freed | B64C 23/06 244/199.3 |
| 4,175,640 | A * | 11/1979 | Birch | F02K 1/386 181/213 |
| 4,696,442 | A | 9/1987 | Mazzitelli | |
| 4,884,772 | A * | 12/1989 | Kraft | B64C 23/06 244/199.1 |
| 5,598,990 | A * | 2/1997 | Farokhi | B64C 23/06 244/200.1 |
| 6,427,948 | B1 | 8/2002 | Campbell | |
| 2008/0067292 | A1* | 3/2008 | Bonnaud | B64D 29/02 244/199.1 |
| 2008/0217485 | A1 | 9/2008 | Ikeda | |

(Continued)

FOREIGN PATENT DOCUMENTS

| | | |
|---|---|---|
| EP | 2 998 219 | 3/2016 |
| FR | 2 986 211 | 8/2013 |

(Continued)

OTHER PUBLICATIONS

European Search Report cited in EP 19200650.0 dated Feb. 11, 2020, 13 pages.

(Continued)

*Primary Examiner* — Brady W Frazier
(74) *Attorney, Agent, or Firm* — Nixon & Vanderhye P.C.

(57) ABSTRACT

An aircraft assembly with a hot air exhaust outlet. The aircraft assembly has an assembly surface over which a hot-air exhaust flow from the hot-air exhaust outlet is exhausted. The aircraft assembly also has a vortex generator with a flow surface. The flow surface lies in an air flow over the vortex generator. The flow surface is arranged to interrupt the hot-air exhaust flow and generates a flow vortex to cool the air flow over the assembly surface.

21 Claims, 5 Drawing Sheets

(56) References Cited

U.S. PATENT DOCUMENTS

| | | | |
|---|---|---|---|
| 2009/0050742 A1 | 2/2009 | Bonnaud et al. | |
| 2011/0000181 A1* | 1/2011 | Oishi | B64C 7/02 |
| | | | 60/39.5 |
| 2011/0290936 A1* | 12/2011 | Machado | B64C 7/02 |
| | | | 244/54 |
| 2012/0001022 A1* | 1/2012 | Morvant | B64D 29/02 |
| | | | 244/1 N |
| 2013/0032663 A1* | 2/2013 | Dravet | B64D 27/18 |
| | | | 244/54 |
| 2014/0331665 A1 | 11/2014 | Shivashankara et al. | |
| 2015/0246731 A1* | 9/2015 | Tateiwa | B64C 7/02 |
| | | | 244/54 |
| 2015/0329200 A1* | 11/2015 | Barrett | G03G 13/26 |
| | | | 244/200.1 |
| 2017/0166317 A1 | 6/2017 | Queau et al. | |
| 2017/0233091 A1* | 8/2017 | Iarocci | B64D 33/08 |
| | | | 244/129.5 |
| 2018/0363588 A1* | 12/2018 | Iglewski | F02C 6/18 |

FOREIGN PATENT DOCUMENTS

| | | |
|---|---|---|
| GB | 2 112 077 | 7/1983 |
| GB | 2481667 | 1/2012 |

OTHER PUBLICATIONS

Combined Search and Examination Report for GB1817479.7, dated Apr. 16, 2019, 8 pages.

Tadashige Ikeda et al., "Smart Vortex Generator Using Shape Memory Alloy", 25$^{th}$ International Congress of the Aeronautical Sciences, 2006, 6 pages.

* cited by examiner

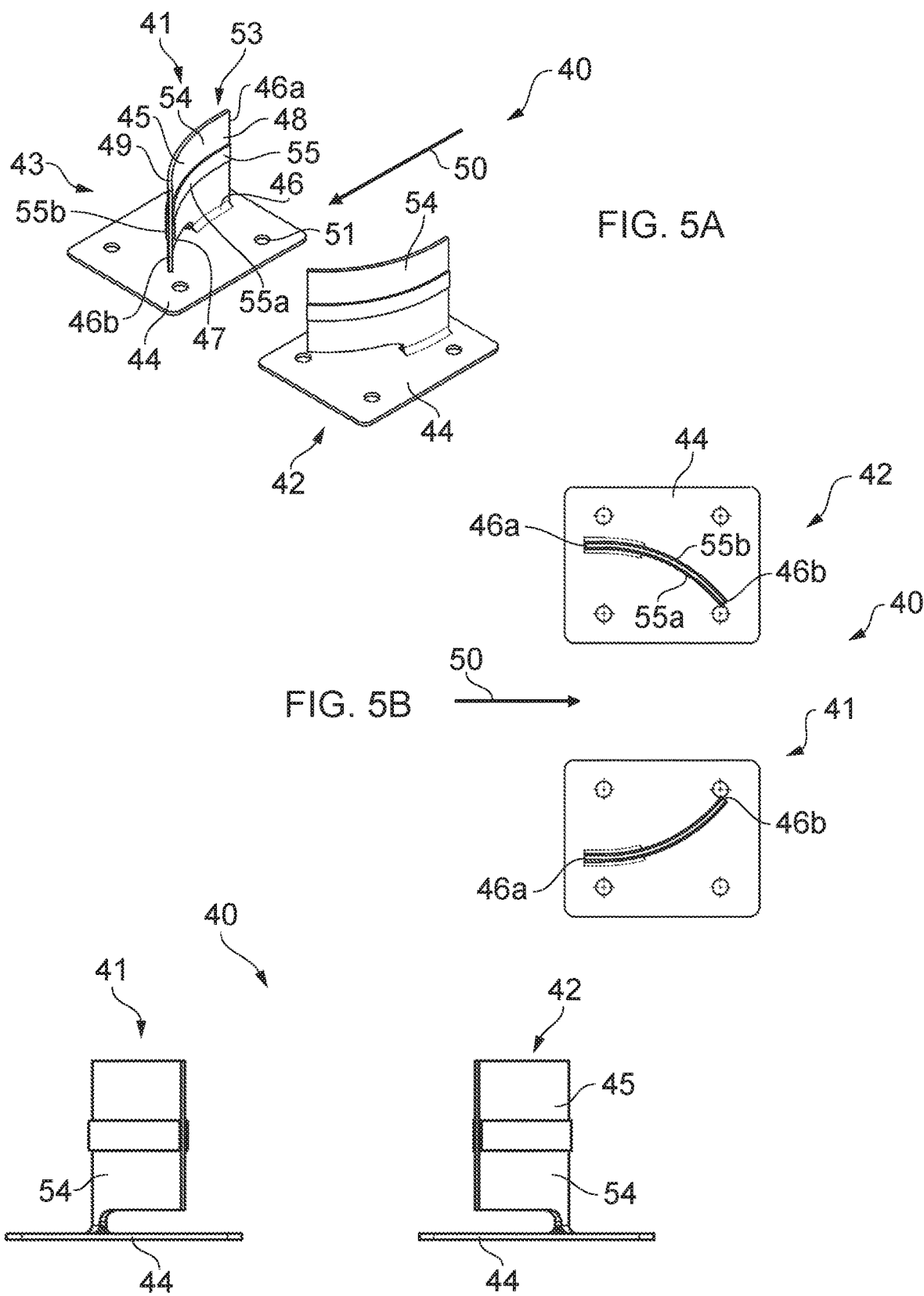

AIRCRAFT ASSEMBLY WITH A HOT-AIR EXHAUST OUTLET AND COOPERATING VORTEX GENERATOR, AND METHOD CONTROLLING SAME

This application claims priority to United Kingdom Patent Application GB 1817479.7 filed Oct. 26, 2018, the entire contents of which is incorporated by reference.

FIELD OF THE INVENTION

The present invention relates to an aircraft assembly. In particular, the present invention relates to an aircraft assembly with a hot-air exhaust outlet, an aircraft, a vortex generator and a method of controlling hot-air exhaust flow from a hot-air exhaust outlet over an aircraft assembly surface.

BACKGROUND OF THE INVENTION

Aircraft are formed from assemblies including a large number of components and sub-assemblies. Typically, lightweight metallic components and composite components, for example aluminium components and carbon fibre composite components respectively, are used to form structural assemblies of the aircraft. In particular, the wings of aircraft are formed from structural assemblies which use aluminium and/or composite materials. Such lightweight materials are used to help minimise weight and fuel economy.

An aircraft has hot-air exhaust outlets through which waste hot air is vented from the aircraft. One such exhaust outlet is a pre-cooler exhaust outlet from an engine of the aircraft. For underwing mounted engines, for example, it is known to vent the hot air from the pre-cooler through a pre-cooler exhaust outlet and over the wing. However, this requires components exposed to the hot-air to be suitable to handle the increased temperatures, for example through the use of titanium components or a heat shield, such as a titanium panel. Such an arrangement increases the weight of the assembly, and the fuel economy of the aircraft.

SUMMARY OF THE INVENTION

According to an aspect of the present invention, there is provided an aircraft assembly comprising: a hot-air exhaust outlet, an assembly surface over which a hot-air exhaust flow from the hot-air exhaust outlet is exhausted, and a vortex generator; wherein the vortex generator comprises a flow surface arranged to lie in an air flow over the vortex generator, in which at least part of the flow surface is configured to interrupt the hot-air exhaust flow and generate a flow vortex to reduce the temperature of the air flow over the assembly surface.

With such an arrangement it is possible to use materials with a lower temperature rating, or to remove a need to provide a shield against the flow of hot-air over the assembly surface.

The vortex generator may be configured to entrain colder air into the hot air moving towards or over the surface. As such, the vortex generator is configured to promote mixing of cooler air into the hot air. Alternatively, or as well as, the vortex generator may be configured to cause a flow vortex to move the hot air away from the assembly surface. Vortex generators are typically used to maintain airflow over a surface, such as a wing, by restricting flow separation. However, with the above arrangement the vortex generators are used to promote flow separation and mixing.

The vortex generator may be disposed between the hot-air exhaust outlet and the assembly surface.

Therefore, the temperature of the air flow may be reduced prior to exhaust air flowing over surface.

The assembly surface may be formed by an upper cover of a wing. The vortex generator may be disposed between the hot-air exhaust outlet and the upper cover.

The vortex generator may be configured to move between an active state, in which the at least part of the flow surface is orientated to interrupt the hot-air exhaust flow and generate a flow vortex to cool the air flow over the assembly surface, and an inactive state, in which the at least part of the flow surface is orientated to provide one of a reduction in the interruption caused by the flow surface on the hot-air exhaust flow and no interruption caused by the flow surface on the hot-air exhaust flow.

An advantage of the above arrangement is that it is possible to minimise the effect of the vortex generator on the hot-air exhaust flow during certain stages of flight, for example at cruise, to maximise the efficiency of the wing, and to maximise the effect of the vortex generator during certain stages of flight, for example take-off and landing. It has been found that the low atmospheric air temperatures and high airflow speed over the wing at altitude during cruise help to negate the high temperature of the hot air exhaust flow without the need for the vortex generators. The flow vortex can help promote cooling of the hot-air exhaust flow over the surface when it has been found that such assistance is required, for example during take-off and landing when the atmospheric air temperature is higher.

The vortex generator may comprise a temperature actuated member exposed to the air flow over the vortex generator. The temperature actuated member may be configured to move the vortex generator between the active state and the inactive state in dependence on the temperature of the air flow over the vortex generator.

By actuating vortex generator in dependence on ambient temperature, it is possible to provide a passive system. With such an arrangement, it is possible for the vortex generators to only be actuated as required to cool the airflow, and as such have minimal interference at other stages of flight when the temperature and speed of airflow over the wing is sufficient to lower the temperature of the hot-air exhaust outlet.

The temperature actuated member may form at least part of the flow surface.

A vane may form at least part of the flow surface.

The temperature actuated member may be configured to act on the vane to adjust the orientation of the flow surface.

As such, the shape of the flow surface may be straightforwardly and reliably formed.

The temperature actuated member may comprise a bistable state member. A bistable state member is a member which is stable in two different forms, such as two different positions or shapes.

The bistable state member may comprise a shape memory alloy. As such, the bistable state member may be easily formed in a desired shape.

The bistable state member may comprise a bistable configuration including a bistable laminate. An advantage of using a bistable laminate is that the vortex generator is able to snap between two fixed states without an intermediate state, and so the shape and orientation in each state may be reliably determined. The bistable configuration may include a thermal expansion member, such as a metallic strip. The thermal expansion member may be a bimetallic strip. The thermal expansion member is configured to act on the bistable laminate in dependence on a temperature variations to impart a mechanical displacement.

The flow surface may be configured to extend at least substantially perpendicular to the assembly surface in the inactive state.

With such an arrangement, the vortex generator does not move into contact with and is not received in a recess in the surface to which it is mounted.

The aircraft assembly of claims 4 to 6, wherein the flow surface is configured to extend at least substantially parallel to the assembly surface in the inactive state.

With such an arrangement, the vortex generator is moved at least substantially out of the air flow in the inactive state.

The aircraft assembly may comprise a wing leading edge assembly. The vortex generator may be at least one of on the wing leading edge assembly or forward of the wing leading edge assembly.

The hot air exhaust outlet may be forward of the wing leading edge assembly.

The aircraft assembly may comprise an engine pylon. The hot air exhaust outlet may be on the engine pylon. The hot air exhaust outlet may be on a side of pylon. The hot air exhaust outlet may be a belly fairing exhaust outlet.

The vortex generator may be on the engine pylon.

The hot-air exhaust outlet may be an engine pre-cooler exhaust outlet.

The vortex generator may be one of at least a pair of vortex generators. The flow surfaces of the pair of vortex generators may be configured to converge towards each other in a downstream direction of the airflow over the pair of vortex generators to interrupt the hot-air exhaust flow.

The flow surfaces of the pair of vortex generators may be configured to diverge away from each other in a downstream direction of the airflow over the pair of vortex generators to interrupt the hot-air exhaust flow.

According to an embodiment of the present invention, there is provided an aircraft comprising the aircraft assembly as set out above.

According to an embodiment of the present invention, there is provided a vortex generator comprising a flow surface arranged to lie in an air flow over the vortex generator, and a bistable laminate member configured to adjust the orientation of the flow surface in response to a temperature change of the bistable laminate member.

With such an arrangement it is possible for the flow surface to be reliably disposed in one of two distinct operating forms, without being positioned in an intermediate operating form.

The bistable laminate member may form the flow surface.

According to an embodiment of the present invention, there is provided a method of controlling hot-air exhaust flow from a hot-air exhaust outlet over an aircraft assembly surface, the method comprising: locating a vortex generator downstream of the hot-air exhaust outlet; and arranging the flow surface of the vortex generator, in at least one operating condition, to lie in an air flow over the vortex generator.

The method may further comprise exposing the temperature actuated member to the air flow over the vortex generator such that the temperature actuated member adjusts the orientation of the flow surface in dependence on the temperature of the air flowing over the vortex generator to affect the air flow over the assembly surface.

BRIEF DESCRIPTION OF THE DRAWINGS

Embodiments of the invention will now be described with reference to the accompanying drawings, in which:

FIGS. 5a to 5c show another vortex generator arrangement in an active state;

DETAILED DESCRIPTION OF EMBODIMENT(S)

Figure 1:
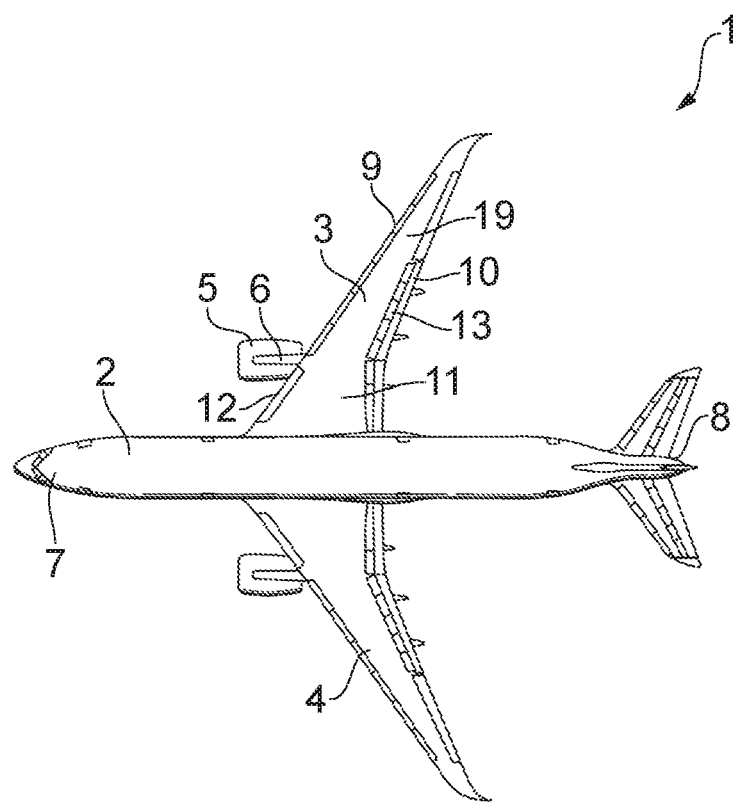
FIG. 1 is a plan view of an aircraft.

FIG. 1 shows an aircraft 10 with a fuselage 2, and starboard and port fixed wings 3, 4. An engine 5 is mounted to each wing 3, 4. The engine 5 is mounted to the wing 3, 4 by an engine pylon 6. The fuselage 2 with a nose end 7 and a tail end 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage. The invention is also applicable to other aircraft, such as helicopters.

Each wing has a cantilevered structure with a length extending in a span-wise direction from a root to a tip, with the root being joined to an aircraft fuselage 4. The wings 2, 3 are similar in construction so only the starboard wing 3 will be described in detail with reference to FIGS. 2 to 8.

The wing 3 has a leading edge 9 and a trailing edge 10. The leading edge 9 is at the forward end of the wing and the trailing edge 10 is at the rearward end of the wing. The wing comprises a wing box 11. A wing box 11 forms a structural assembly including forward and rearward spars (not shown), ribs extending between the forward and rearward spars and upper and lower covers. Upper cover 19, acting as an assembly surface, is shown. The wing 3 includes a leading edge assembly 12 and a trailing edge assembly 13. The leading edge assembly 12 is at a forward end of the wing box 11. The trailing edge assembly 13 is at the rearward end of the wing box 11.

The leading edge assembly 12 defines the leading edge 9. The trailing edge assembly 13 defines the trailing edge 10.

The wing 3 has a spanwise axis which extends in a direction from the wing root to the wing tip, and a chordwise axis which extends in the direction from the leading edge 9 to the trailing edge 10.

In the following description, the term "front" refers to components towards the leading edge of the wing, and the term "rear" refers to components towards the trailing edge of the wing. The terms "forward" and "rearward" shall be construed accordingly. The position of features may be construed relative to the components, for example a forward component may be disposed on the forward side of another component, but towards the rear of the wing.

Figure 2:
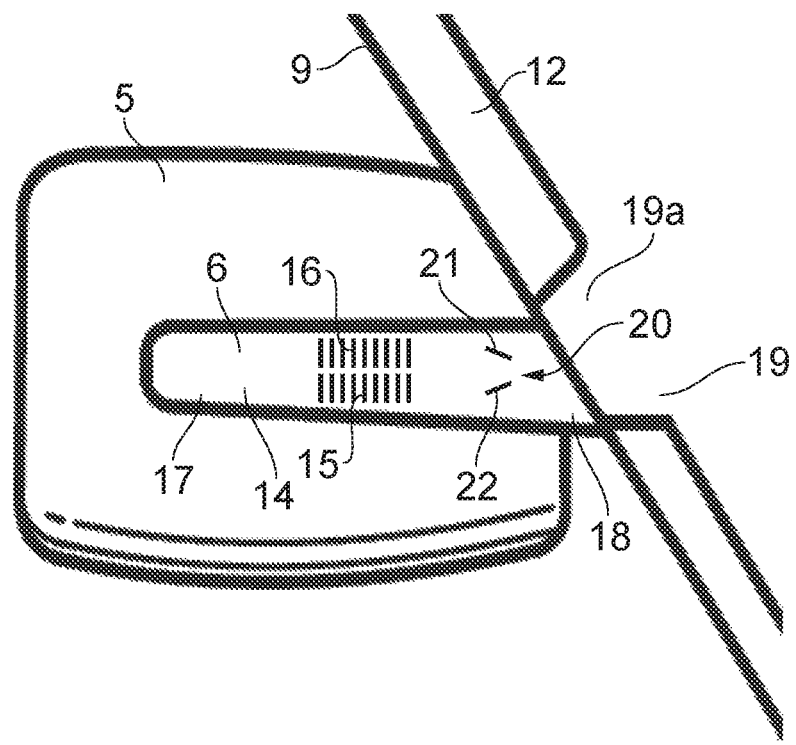
FIG. 2 is a plan view of part of a leading edge side of a wing of the aircraft of FIG. 1.

Referring to FIG. 2, the engine 5 is an underwing mounted engine. The engine 5 is below the wing. The pylon 6 mounts the engine to the underside of the wing 3. The engine 5 and pylon 6 together form an engine assembly.

The pylon 6 extends forward over the leading edge 9 of the wing 3. The pylon 6 is elongate in plan view and extends from the wing 3. The pylon 6 has an upper side. The upper side of the pylon 6 has an upper surface 14. The upper surface 14 of the pylon is visible in plan view, as seen in FIG. 2. The pylon upper surface 14 extends forward of the leading edge 9 of the wing 3. In the present arrangement the pylon 6 extends forward of the upper cover 19 of the wing, acting as an assembly surface. In alternative arrangements, the upper cover 19 may be spaced from the leading edge 9 of the wing 3. The upper cover 19 includes an extended portion 19a in the proximity of the pylon 6. In an alternative arrangement, a cover or slat of the leading edge assembly 12 may be disposed between the upper cover 19 and the leading edge 9. The surface of the leading edge assembly 12 may form part of the upper cover 19.

The engine 5 has a pre-cooler exhaust outlet 15. The pre-cooler exhaust outlet 15 acts as a hot-air exhaust outlet. The pre-cooler exhaust outlet 15 exhausts hot air from the pre-cooler of the engine 5. The engine 5 may have other hot air exhaust outlets.

The pre-cooler exhaust outlet 15 comprises vents 16. The vents 16 are arranged in the upper surface 14 of the pylon 6. The number and configuration of the vents 16 may vary. The vents 16 are exposed an airflow over the wing during normal operation of the aircraft 1. The vents 16 are disposed forward of the leading edge 9 of the wing 3. The vents 16 are disposed between a forward end 17 of the pylon 6 and a rearward end 18 of the pylon 6. Hot air from the pre-cooler exhaust outlet 15 is vented through the pylon 6 of the engine arrangement and vented into the airflow forward of the wing 3. Hot air from the pre-cooler exhaust outlet 15 is therefore vented over the rearward end 18 of the pylon 6 and over the wing 3 in a chordwise direction.

A vortex generator arrangement 20 is disclosed rearward of the pre-cooler exhaust outlet 15. The vortex generator arrangement 20 comprises a pair of vortex generators 21, 22. The number of vortex generators 21, 22 in the vortex generator arrangement may vary. The vortex generator arrangement 20 is on the pylon 6. The vortex generator arrangement 20 is on the pylon upper surface 14 rearward of the exhaust outlet 15. The vortex generator arrangement 20 is forward of the wing leading edge 9. As shown in FIG. 2, the vortex generator arrangement 20 is between the exhaust outlet 15 and the upper cover 19 acting as the assembly surface. The vortex generator arrangement 20 is disposed to lie in the airflow rearward of the exhaust outlet 15 and forward of the upper cover 19.

The vortex generator arrangement 20 will now be described in greater detail with reference to FIGS. 3 and 4. The vortex generator arrangement 20 comprises the first vortex generator 21 and the second vortex generator 22. The first vortex generator 21 will be described herein, however it will be understood that the second vortex generator 22 is substantially a mirror image of the first vortex generator 21 and comprises the same features.

The vortex generator 21 comprises a body 23. The first vortex generator 21 is formed as a single piece component. The body 23 comprises a base 24, a temperature actuated member 25 and a vane 26. The temperature actuated member 25 is between the vane 26 and the base 24. In alternative arrangements, it will be understood that the temperature actuated member 25 may include one or both of the base 24 and the vane 26. The temperature actuated member 25 is formed from a temperature actuated material. That is, a material which is configured to change shape in response to a change in temperature. The vane 26 and the base 24 may be formed from the temperature actuated material. The temperature actuated material is a shape memory alloy. Suitable shape memory alloys include alloys of nickel-titanium, copper-aluminium-nickel-titanium, and zinc-copper-gold-iron.

The temperature actuated member 25 is configured to change shape in response to temperature variations. The temperature actuated member 25 is configured to move between two forms in dependence on the temperature applied to it. The change in form is achieved by the shape memory alloy undergoing a phase transformation between a higher temperature stable phase and a lower temperature stable phase. The shape memory alloy is configured to have two stable phases.

The vane 26 extends from the temperature actuated member 25. The base 24 extends from an opposing end of the temperature actuated member 25. The vane 26 has a first flow surface 27 and a second flow surface 28. The vane 26 is a panel forming the first and second flow surfaces 27, 28. The vane 26 has a forward edge 26a and a rearward edge 26b. The rearward edge 26b is configured to be downstream of the forward edge 26a. The forward edge 26a is a chamfer.

The vortex generator 21 is mounted to the pylon upper surface 14 by a mount 29. The mount 29 comprises holes in the base 24 and suitable fixings. As such, a mounting face 24a of the base 24 abuts the pylon upper surface 14. In embodiments, a recess is formed in the pylon upper surface 14 to accommodate the vortex generator 21. Other configurations may be used, such as bonding.

Figure 3A:
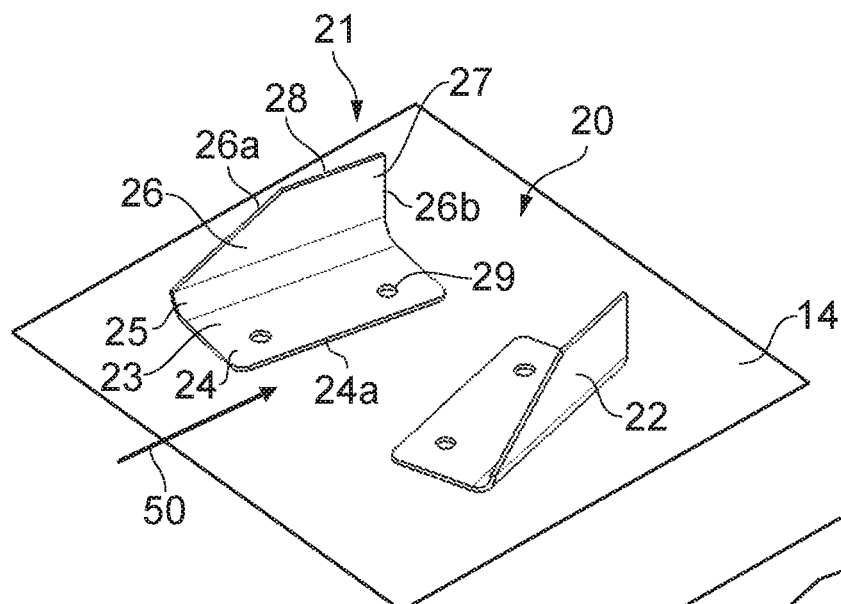
FIG. 3a is a perspective view of a vortex generator arrangement including a pair of vortex generators in an active state.
Figure 3B:
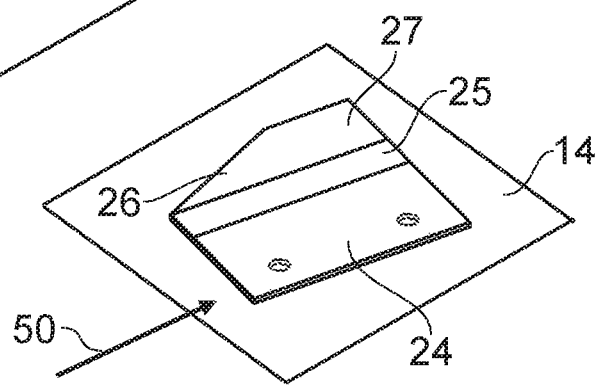
FIG. 3b is a perspective view of one of the vortex generators in an inactive state.

In FIG. 3a the vortex generator 21 is shown in an active state. In FIG. 3b, the vortex generator 21 is shown in an inactive state. The direction of the air flow over the vortex generator 21 is shown by arrow 50. The air flow as shown by arrow 50 includes the hot-air exhaust flow from the hot air exhaust outlet 15.

The vane 26 of the vortex generator 21 in the active state extends substantially perpendicular to the pylon upper surface 14 acting as the vortex generator mounting surface. In the active state, the first flow surface 27 is at an angle to the general direction of the airflow over the vortex generator 21. That is, at least a proportion of the first flow surface 27 is non-parallel to the direction of the airflow over the vortex generator arrangement 20. The first flow surface 27 protrudes into the airflow 50. The base 24 lies parallel with the pylon upper surface 14 and so is generally parallel with the airflow direction. In the active state, the first flow surface 27 interrupts the airflow flowing over the vortex generator arrangement 20.

In the inactive state, as shown in FIG. 3b, the first flow surface 27 lies substantially parallel to the flow direction over the vortex generator arrangement 20. The vane 26 is moved into a position in which it substantially lies against the pylon upper surface 14 so that it does not protrude into the airflow over the vortex generator 20.

Figure 4A:
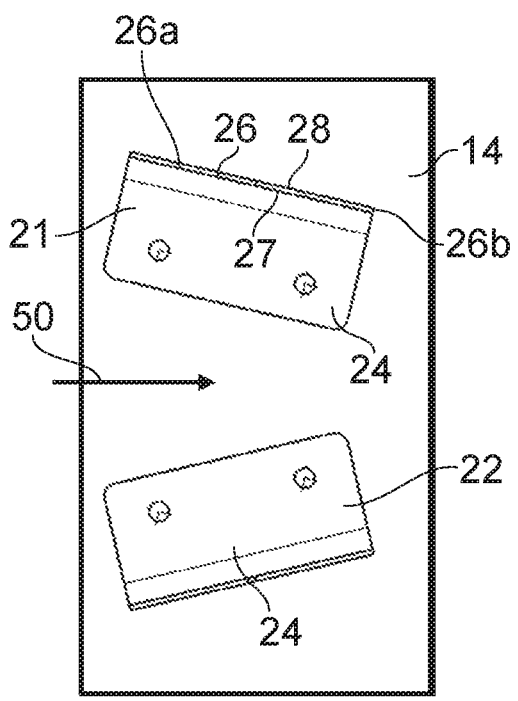
FIG. 4a is a plan view of the vortex generator arrangement in a converging configuration.

As shown in FIG. 4a, the vortex generator arrangement 20 has a converging configuration. That is, the first flow surfaces 27 of each of the first and second vortex generators 21, 22 converge towards each other in a downstream direction when in the active state. As such, the first flow surface 27 at least partially faces towards the oncoming airflow as indicated by arrow 50.

Figure 4B:
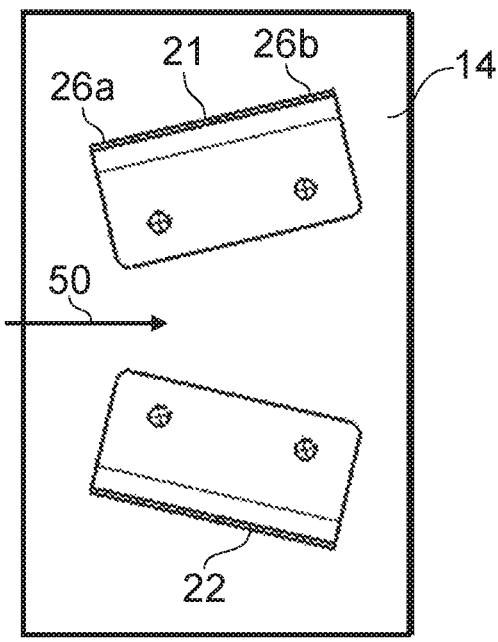
FIG. 4b is a plan view of the vortex generator arrangement in a diverging configuration.

In an alternative arrangement, as shown in FIG. 4b, the vortex generator arrangement 20 has a diverging configuration in the active state. In the diverging configuration, the flow surfaces 27, 28 of the vortex generators 21, 22 diverge away from each other in the downstream direction. The outer second flow surfaces 28 of the first and second vortex generators 21 and 22 at least partially face into the airflow over the vortex generator arrangement 20.

The vortex generators 21, 22 are exposed to the ambient air temperature of the airflow flowing over the pylon upper surface 14 rearward of the exhaust outlet 15, and therefore the air flow on to the upper cover 19. The vortex generators 21, 22 are passively actuated in dependence on the ambient temperature over the vortex generator arrangement 20. The temperature actuated member 25 has two stable forms in dependence on the shape memory alloy. In a high temperature range, the temperature actuated member 25 is configured to have a suitable form to cause the vortex generator 21 to interrupt the airflow over the vortex generator arrangement 20. In a low temperature range, the temperature actuated member 25 is configured to have a suitable form to cause the vortex generator to reduce or eliminate the interruption caused by the flow surface on the hot-air exhaust flow. In the present configuration, the shape memory alloy of the temperature actuated member 25 is configured to have an arcuate shape when exposed to a high temperature and a planar shape when exposed to a lower temperature. In the present embodiment, suitable temperature ranges for the temperature actuated member 25 to be in the high temperature state is above about 80 degrees Celsius and low temperature state is below about 80 degrees Celsius. It will be understood that the temperature ranges, and suitable materials for forming the temperature actuated member 25 are determined based on the pre-determined acceptable temperature range for the material to be protected. For example, the transition temperature of about 80 degrees Celsius is based on the use of age-hardened Aluminium alloys for the surface to be protected. For a composite material, a higher transition temperature may be used.

During operation of the aircraft 1, the hot air exhausted from the exhaust outlet 15 is directed rearwardly over the upper cover 19 of the wing 3. During take-off and landing, for example, the aircraft is at a low altitude and low speed and so the temperature of the hot-air exhaust flow over the upper cover is typically high. In such conditions, the temperature of the air flow over the vortex generator arrangement 20 is above a transition temperature at which the temperature actuated member 25 is actuated, and so the ambient temperature of the airflow causes the vortex generator 21 to move into the active state. In the present embodiment the transition temperature is 80° C. In this condition, the pair of vortex generators 21, 22 act on the airflow to cause mixing of the hot exhaust air with surrounding cold air. This is caused by the vortex generator arrangement 20 generating vortices.

As the aircraft 1 moves into a cruise condition of its flight, the altitude at which the aircraft is operating increases and so the atmospheric air temperature decreases. Furthermore, the airflow speed over the wing increases. In such conditions, the hot air exhaust flow from the hot air exhaust outlet 15 mixes with the surrounding cold air which is at a low temperature and speed suitable to reduce the temperature of the airflow over the vortex generator arrangement 20 to a temperature lower than the transition temperature. In such conditions, the temperature actuated member 25 moves from its high temperature form to its low temperature form. That is the shape memory alloy undergoes a phase transformation from the high temperature stable phase to the low temperature stable phase. The flow surfaces 27, 28 of the vortex generator 21 move into a position in which they are orientated to reduce or eliminate the interruption caused by the flow surface on the hot-air exhaust flow, and do not generate flow vortices.

In the present embodiment, the vortex generator is configured to move the flow surfaces to be parallel to the pylon upper surface 14, and so lie parallel with the air flow direction over the vortex generator arrangement 20. In an alternative arrangement, the temperature actuated member 25 acts to maintain the flow surfaces 27, 28 in a substantially perpendicular orientation to the pylon upper surface 14, but to extend generally parallel to the airflow direction over the vortex generator arrangement 20 when in their inactive state. In such a configuration, the flow surface 27 moves about an axis extending perpendicular to the surface on which it is mounted.

An advantage of the above described arrangements is that the vortex generator arrangement 20 is a passive system which does not require any external power or control system to operate. It will be understood that the threshold temperature at which the vortex generator arrangement 20 moves from its active and inactive states may differ and is dependent on the selection of a suitable shape memory alloy.

An alternative embodiment will now be described with reference to FIGS. 5 and 6. An alternative vortex generator arrangement 40 including first and second vortex generators 41, 42 will now be described. Operation of the vortex generator arrangement 40 is generally the same as the vortex generator 20 arrangement described above.

Figure 6A:
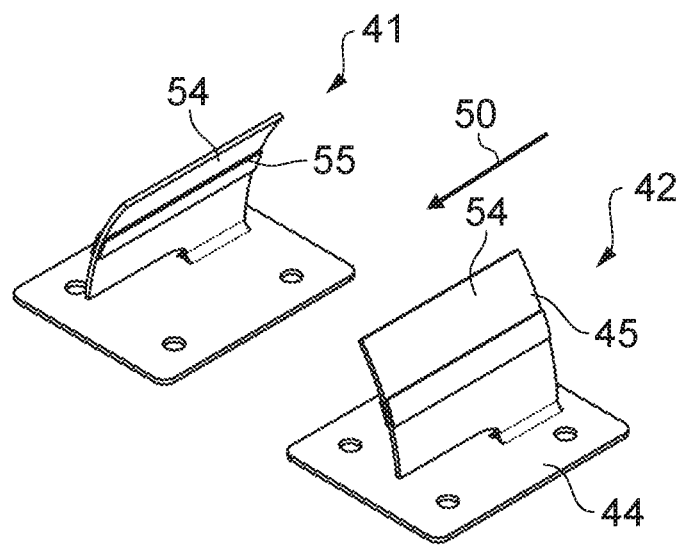
FIGS. 6a to 6c show another vortex generator in an inactive state.
Figure 6B:
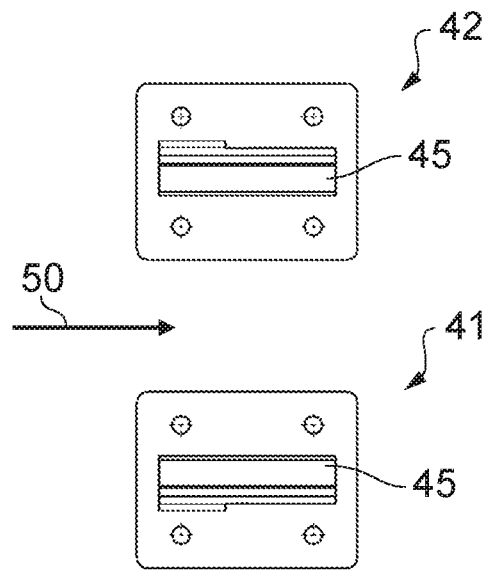
Figure 6C:

In FIGS. 5a to 5c, the vortex generator arrangement 40 is shown in its active state, and in FIGS. 6a to 6c, the vortex generator is shown in its inactive state.

The location of the vortex generator arrangement 40 is generally the same as the arrangement and positioning of the vortex generator arrangement 20 described above. The vortex generator 20 is disposed on the pylon upper surface 14 downstream of the exhaust 15. The pair of vortex generators 41, 42 forming the vortex generator arrangement 40 are spaced apart from each other in a direction perpendicular to the airflow direction indicated by arrow 50. The vortex generator arrangement 40 is shown in the figures having a converging configuration, however it will be understood that the vortex generator arrangement 40 may have a diverging configuration. The first vortex generator 41 will now be described, however it will be understood that the second vortex generator 42 has a substantially mirrored configuration and the same features.

The vortex generator 41 has a body 43. The body 43 includes base 44 and vane 45. The vane 45 extends to the base 44 via junction 46. The junction 46 extends along part of the vane 45. A cutaway 47 is formed between a free end of the vane 45 and the base 44. The free end of the vane 45 is free to move relative to the base 44. The vane 45 comprises a first flow surface 48 and a second flow surface 49.

A mount 51 mounts the base 44 to the pylon upper surface 14 acting as the vortex generator mounting surface. The mount 51 includes holes and fixings, although other configurations may be used, such as bonding.

The vane 45 acts as a temperature actuated member. The temperature actuated member is a bistable laminate configuration 53. In the present embodiment, the bistable laminate configuration 53 forms the vane 45. In alternative arrangement the vane 45 extends from the bistable laminate configuration 53 such that the temperature actuated member and vane are separate features of the vortex generator 41.

The bistable laminate configuration 53 comprises a bistable laminate panel 54 and a bimetallic member 55. The bistable laminate in the current embodiment is a carbon fibre reinforced polymer, although other suitable materials may be used to form the bistable laminate.

The bistable laminate panel comprises at least two plies in a perpendicular orientation to each other. The plies are, for example, carbon fibre plies in a cured resin substrate. The bistable laminate 54 is configured to have two stable forms. In the two stable forms the internal stresses due to differential shrinkage of the fibres and resin substrate after curing of the bistable laminate are balanced by the stresses caused by curvature, for example compression, on the inside of a curved shape of the bistable laminate panel and tension on the outside. The two stable shapes are substantially arcuate. The bistable laminate panel 54 is shown in the first stable form in FIGS. 5a to 5c and in the second stable form in FIGS. 6a to 6c. The bimetallic member 55 is disposed on the bistable laminate panel 54. The bimetallic member 55 comprises a first bimetallic member element 55a on the first flow surface 48 and a second bimetallic member element 55b on the second flow surface 49. The bimetallic member 55 is elongate and extends in an elongate direction along the bistable laminate panel 54.

The bimetallic member 55 is a bimetallic strip. The bimetallic member 55 acts as a metallic thermal expansion member. In an alternative embodiment, the bimetallic member is a mono-metallic strip. That is, a member formed from a single metal strip, for example copper. The bimetallic member 55 exerts differing forces on the bistable laminate panel 54 in dependence on the temperature of the bimetallic member 55. Suitable materials include metallic materials with different coefficients of thermal expansion, such as steel and copper, or steel and brass.

The bimetallic member 55 is configured to apply a variable force on the bistable laminate panel 54 in dependence on the temperature of the bimetallic member 55. The vortex generator 41 is exposed to the airflow across the vortex generator arrangement 40 and so the temperature of the bimetallic member 55 changes in response to a change in the airflow temperature. The bimetallic member 55 is configured to expand and contract is response to a temperature change. The force exerted by the bimetallic member 55 in dependence on the ambient temperature across the vortex generator 41 causes the bimetallic member 55 to apply differing loads. At a first temperature range the bimetallic member 55 applies a first load, such as a low load, on the bistable laminate panel 54. The bistable laminate panel 54 is therefore in a first operating state. As the temperature changes, the bimetallic member 55 exerts a differing load, for example a higher load, on the bistable laminate panel 54 which is above pre-determined transition temperature, in dependence on the relative stiffness of the laminate and bimetallic member 55. The load acting on the bistable laminate panel 54 above the transition temperature is sufficient to allow the laminate to snap between its two stable forms, such that it moves from its active state into its inactive state. It will be understood that the loaded condition of the bistable laminate arrangement 53 may occur in either of the active or inactive states of the vortex generator arrangement 40.

Operation of the vortex generator arrangement 40 will now be described with reference to FIGS. 5 and 6. As shown in FIGS. 5a to 5c, the vortex generators 41, 42 are initially in their active state. That is, the flow surfaces 48, 49 are disposed to interrupt the airflow across the vortex generator arrangement 40. In this condition, the vanes 45 of the vortex generators 41, 42 are arcuate about an axis perpendicular to the base 44. As such, the flow surfaces 48, 49 at least partially face into the airflow as indicated by arrow 50. The bistable laminate panel 54 is in its first stable shape, with the bimetallic member 55 applying a first loading condition to the bistable laminate panel 54. In the present arrangement, the bimetallic member 55 applies a high load when the ambient temperature is in a first high temperature range, and a second load condition, such as a low load, when the temperature range is a low temperature range. It is anticipated in the present embodiment that the transition temperature will be approximately 80 degrees Celsius. As the ambient temperature of the airflow across the vortex generator arrangement 40 changes, and decreases, the load applied to the bistable laminate panel 54 changes. When the temperature of the bimetallic member 55, as determined by the ambient temperature of the airflow, falls below the transition temperature, the change in load causes the bistable laminate panel 54 to move from its first operating form, as shown in FIGS. 5a to 5c, to its second operating shape, as shown in FIGS. 6a to 6c. In the second operating condition the load applied to the bistable laminate panel 54 is lower than the load applied in the first operating condition. When the vortex generators 41, 42 move to their inactive state, the vortex generators 41, 42 minimise their interruption on the airflow. In the inactive state, the vanes are arcuate about an axis of curvature extending substantially parallel to the direction of airflow across the vortex generator arrangement 40. In such a condition, the flow surfaces 48, 49 extend parallel to the flow direction and so do not substantially interrupt the flow through the vortex generator arrangement 40. As such, vortices are not created in the airflow across the vortex generator arrangement 40. The action on the airflow to the upper cover 19 is generally the same as described above with reference to FIGS. 3 and 4 and so a detailed description will be omitted.

Figure 7A:
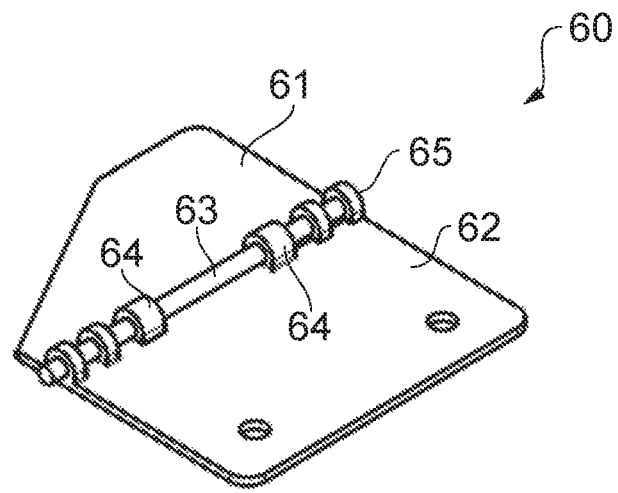
FIG. 7a shows a further vortex generator in an inactive state.
Figure 7B:
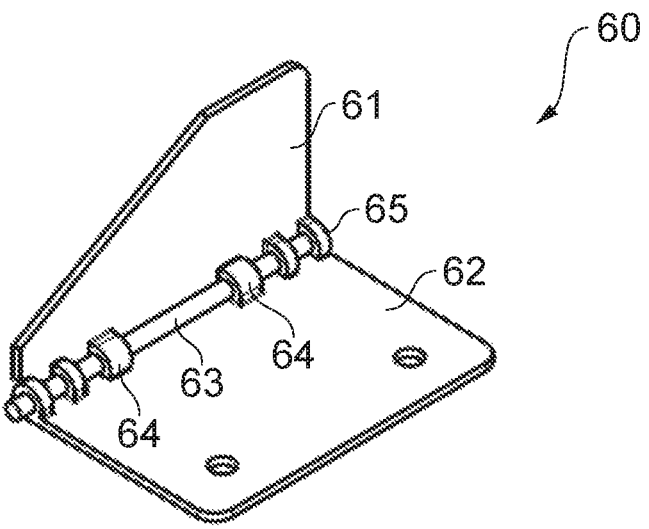
FIG. 7b shows the vortex generator of FIG. 7a in an active state.

It will be understood that further configurations of the vortex generator arrangement are envisaged. In an alternative arrangement of a vortex generator as shown in FIGS. 7a and 7b, a vortex generator 60 comprises a vane 61 and a base 62 which are pivotable about a shaft 63. A hinge arrangement 65 including the shaft 63 pivotably joins the vane 61 to the base 62.

A temperature actuated member 64 acts about the shaft to pivot the vane about the shaft relative to the base 62. The temperature actuated member 64 is formed from a bistable member. The bistable member comprises a shape memory alloy. Operation is generally the same as described above and so a detailed description will be omitted. In FIG. 7a, the vortex generator 60 is shown in an inactive state, with the vortex generator 60 being shown in the active state in FIG. 7b.

Although in the above described embodiments the vortex generators of the vortex generator arrangements are configured to move between an active and an inactive state, it will be understood that in alternative embodiments the vortex generators are fixed in the active state and do not move into an inactive state. In one embodiment, the vortex generators comprise a configuration as shown in FIGS. 3a and 4a, but are formed from a rigid material which does not change shape in response to temperature changes in the airflow over the vortex generator arrangement. In such an arrangement the vortex generators are always active to cause vortices to lower the airflow temperature from the exhaust outlet.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly on a wing comprising:
a hot-air exhaust outlet configured to exhaust hot air,
an upper cover of the wing over which flows the hot-air exhaust from the hot-air exhaust outlet, and
a vortex generator between the hot air exhaust outlet and the upper cover,
wherein the vortex generator comprises a flow surface arranged to lie in the flow of the hot-air exhaust, in which at least part of the flow surface is, in at least one operating condition, configured to interrupt the flow of the hot-air exhaust and generate a flow vortex that reduces a temperature of the flow of the hot-air exhaust over the upper cover of the wing.

2. The aircraft assembly of claim 1, wherein the vortex generator is adjacent a leading edge of the wing and configured to move between an active state, in which the at least part of the flow surface is orientated to interrupt the flow of the hot-air exhaust and generate the flow vortex to cool the flow of the hot-air exhaust over the upper cover of the wing, and an inactive state, in which the at least part of the flow surface is orientated to provide one of a reduction in the interruption caused by the flow surface on the flow of the hot-air exhaust and no interruption caused by the flow surface on the flow of the hot-air exhaust.

3. The aircraft assembly of claim 2, wherein the vortex generator comprises a temperature actuated member exposed to the air flow over the vortex generator; and wherein the temperature actuated member is configured to move the vortex generator between the active state and the inactive state in dependence on the temperature of the flow of the hot-air exhaust over the vortex generator.

4. The aircraft assembly of claim 2, wherein the temperature actuated member comprises a bistable state member.

5. The aircraft assembly of claim 4, wherein the bistable state member comprises at least one of a shape memory alloy and a bistable laminate.

6. The aircraft assembly of claim 2, wherein the flow surface is configured to extend perpendicular to the upper cover of the wing in the active state.

7. The aircraft assembly of claim 1, wherein the wing includes a wing leading edge assembly, and wherein the vortex generator is forward of the wing leading edge assembly.

8. The aircraft assembly of claim 1, comprising an engine pylon, and wherein the hot-air exhaust outlet is on the engine pylon.

9. The aircraft assembly of claim 1, wherein the hot-air exhaust outlet is an engine pre-cooler exhaust outlet.

10. An aircraft comprising the aircraft assembly according to claim 1.

11. A method of controlling hot-air exhaust flow from a hot-air exhaust outlet over an upper cover of a wing, the method comprising:
locating a vortex generator downstream of the hot-air exhaust outlet and between the hot-air exhaust outlet and the upper cover of the wing,
arranging a flow surface of the vortex generator, in at least one operating condition, to lie in an air flow over the vortex generator, wherein the air flow includes hot-air exhaust flowing from the hot-air exhaust outlet and the airflow moves over the upper cover of the wing,
generating a flow vortex by the vortex generator as the air flow flows over and is interrupted by the vortex generator, and
reducing a temperature of the air flow over the upper cover of the wing due to the flow vortex.

12. A vortex generator comprising:
a flow surface arranged to lie in an air flow over the vortex generator, and
a bistable laminate member comprising:
a bistable laminate configured to snap between two stable states;
a thermal expansion member configured to act on the bistable laminate in response to a temperature variation to impart a mechanical displacement which adjusts an orientation of the flow surface in response to a temperature change of the bistable laminate member.

13. The vortex generator of claim 12, wherein the bistable laminate member forms the flow surface.

14. The vortex generator of claim 12, wherein the vortex generator is configured to move between an active state, in which at least a part of the flow surface is orientated to interrupt the air flow over the vortex generator, and an inactive state, in which the at least part of the flow surface is orientated to provide one of a reduction in the interruption caused by the flow surface on the air flow and no interruption caused by the flow surface on the air flow.

15. The vortex generator of claim 14, wherein the vortex generator is configured to snap between the active state and the inactive state.

16. The vortex generator of claim 14, wherein the flow surface is configured to extend at least substantially perpendicular to a vortex generator mounting surface in the active state.

17. The vortex generator of claim 14, wherein the flow surface has an arcuate shape in the active state and a planar shape in the inactive state.

18. An aircraft assembly comprising:
a hot-air exhaust outlet,
an assembly surface over which a hot-air exhaust flow from the hot-air exhaust outlet is exhausted, and
a vortex generator;
wherein the vortex generator comprises a flow surface arranged to lie in the hot-air exhaust flow, and
wherein the vortex generator comprises a bistable laminate member configured to snap between two arcuate stable states, the stable states formed by internal stresses in the bistable laminate balanced by stresses caused by curvature in the bistable laminate, wherein the bistable laminate is configured to adjust the orientation of the flow surface in response to a temperature change of the hot-air exhaust flow.

19. The aircraft assembly of claim 1, wherein the vortex generator is adjacent a leading edge of the wing.

20. The method of claim 11, wherein the vortex generator is adjacent a leading edge of the wing.

21. The method of claim 20, further comprising moving the vortex generator between an active state, in which the at least part of the flow surface is orientated to interrupt the air flow over the vortex generator, and an inactive state, in which the at least part of the flow surface is orientated to provide one of a reduction in the interruption caused by the flow surface on the air flow and no interruption caused by the flow surface on the air flow.

\* \* \* \* \*